United States Patent [19]

Vaihoja et al.

[11] Patent Number: 5,835,858

[45] Date of Patent: Nov. 10, 1998

[54] EASY ACTIVATION OF A CELLULAR PHONE

[75] Inventors: Juha Vaihoja, Tupos; Mikko Lietsalmi, Oulu; Jorma Seppanen, Oulu; Jaakko Vanttila, Oulu, all of Finland

[73] Assignee: Nokia Mobile Phones, Ltd., Finland

[21] Appl. No.: 563,634

[22] Filed: Nov. 28, 1995

[51] Int. Cl.$^6$ ............................................. H04M 11/00
[52] U.S. Cl. .......................... 455/419; 455/418; 455/411
[58] Field of Search .................................. 455/551, 418, 455/403, 550, 419, 411; 380/23; 340/825.34

[56] References Cited

U.S. PATENT DOCUMENTS

| | | | |
|---|---|---|---|
| 5,233,656 | 8/1993 | Langrand et al. | 380/23 |
| 5,297,191 | 3/1994 | Gerszberg | 455/419 |
| 5,315,638 | 5/1994 | Mukari | 455/551 |
| 5,386,455 | 1/1995 | Cooper | 455/419 |
| 5,414,753 | 5/1995 | Ehara | 455/551 |
| 5,465,288 | 11/1995 | Falvey et al. | 455/551 |
| 5,485,505 | 1/1996 | Norman et al. | 455/551 |
| 5,551,073 | 8/1996 | Sammarco | 455/411 |
| 5,572,571 | 11/1996 | Shirai | 455/551 |

OTHER PUBLICATIONS

TDMA Forum Implemantation Guide Version 2.0 dated Mar. 9, 1995.

TDMA Cellular Systems Working Group 6 TR45.3.6 "On–Air Activation Version 6.2", dated Apr. 25, 1995.

TIA Wideband Spread Spectrum Digital Technologies User Needs and Services Working Group TR45.5.1 "Stage 1 Description of Over–the–Air Activation Feature" dated Jul. 18–22, 1994.

TIA Wideband Spread Spectrum Digital Cellular System "Stage 2 Description for Over–the–Air Activation" TR45.5 dated Sep. 12, 1994.

TIA Wideband Spread Spectrum Digital Cellular System, TR45.5 "Stage 3 D" for Over–the–Air Activation dated Sep. 12, 1994.

*Primary Examiner*—Dwayne Bost
*Assistant Examiner*—Tracy M. Legree
*Attorney, Agent, or Firm*—Perman & Green, LLP

[57] ABSTRACT

An Easy Activation sequence for cellular phones that includes a checking code calculation feature which enables a phone owner or user to safely carry out operator assisted NAM programming activation locally in the phone independent of the support provided by the network. The user need only key in a MIN, SID, and checksum in response to appropriate prompts and obtain an indication of whether the NAM programming has been correct or not. Various other parameters, such as A-key and alphanumeric SID, may also be accomodated.

20 Claims, 4 Drawing Sheets

| FIELD | VALUES. HOW GENERATED. |
|---|---|
| 1. HOME SYSTEM IDENTIFICATION (SID): | FROM USER. |
| 2. OWN PHONE NUMBER (MIN): | FROM USER. |
| 3. NAM STATUS: | ENABLED/DISABLED. WHEN PROGRAMMING IS COMPLETE, THE NAM IS ENABLED. |
| 4. ACCESS METHOD: | ALWAYS SET TO 1. |
| 5. LOCAL OPTIONS: | ALWAYS SET TO 1. |
| 6. OVERLOAD CLASS: | LAST DIGIT OF OWN NUMBER (0-9). |
| 7. PRIMARY PAGING CHANNEL: | 333(ODD SID) OR 334(EVEN SID). |
| 8. SECONDARY PAGING CHANNEL: | 708(ODD SID) OR 737(EVEN SID). |
| 9. GROUP ID: | ALWAYS SET TO 10. |
| 10. MOBILE NETWORK CODE: | EMPTY. |
| 11. A-KEY: | — |

FROM THESE VALUES, THE NUMBERS 4, 5, AND 9 ARE FACTORY DEFAULTS AND ARE NOT SET DURING THE EASY ACTIVATION PROCESS.

FIG. 1

EASY ACTIVATION OF A CELLULAR PHONE

BACKGROUND OF THE INVENTION

1. Field of the Invention

The present invention relates to cellular telephones, either analog or digital, that use a Number Assignment Module (NAM) or the like for storing activation information, and more particularly to a simplified method and means for manually programming the NAM of a cellular phone to activate it for operation in a cellular network.

2. Problem to be Solved

U.S. cellular phones, irrespective of whether they are designed for AMPS, NAMPS, DAMPS or CDMA compatible operation, have subscriber specific information elements, such as an owner number and paging channels, stored in an information structure that resides in the EEPROM memory of the product. In this regard, both analog and digital phones may use a Number Assignment Module (NAM) or the like for storing activation information. The NAM fields must be correctly filled in before the phone can be used for making or receiving calls. The activity of filling in the NAM information will be called "activation" hereinafter.

From the carrier and distribution point of view, easy and fast activation is extremely critical in order to be able to handle the growing number of phones being marketed for use in cellular networks. Traditionally, the phone dealer has programmed in all the information for the customer, and the activation process has taken several minutes to complete. This is no longer being considered a satisfactory procedure. There are several ways of speeding up the NAM programming, and making it unnecessary for the dealer to program in the NAM information. For example, these ways can be divided into three main categories:

1. Over-the-Air (OTA) NAM programming, in which all NAM information is automatically sent from the network to the phone so that neither the end user nor the dealer has to program in anything;
2. Preprogramming of the phones, wherein programming of the NAM information is done in the factory or distribution center; and
3. Operator assisted NAM programming, in which the owner or user enters or keys in the NAM information with operator assistance.

Regarding the last category, 3., there are a number of factors and problems that must be dealt with in providing a satisfactory system. For example, the phone should provide the user or programmer with appropriate prompts and feedback messages while the programming proceeds, so that the general requirement of 'easy to use' is fulfilled. The programming method, for wide acceptance, should be identical in all manufacturers' phones, and independent of the cellular system. There should be no manufacturing cost penalty resulting from including the procedure, and the procedure itself should capable of being performed using only the number keys, and *, #, Send, and End keys, to make sure that any keypad variant can use the same method. In addition to this, all phones should also have a full NAM programming feature that allows any of the NAM fields in multiple NAM elements to be changed manually.

Perhaps the most important problem is that the operator assisted NAM programming procedure may require a phone owner or user to key in the essential NAM fields and any mistyped digits will lead to a situation where the phone will not work. Since an erroneous NAM input must not be accepted, the phone should probably have some check procedure that can verify whether the new NAM input is correct. It is thus desirable to consider a number of factors to ensure and facilitate the successful completion of the procedure. Some of the requirements in this regard will be driven by the carrier and the phone manufacturer, and manner of checking will likely involve some information the user is supposed to key in, but it is desirable that the number of keystrokes required be minimized.

Prior art

The TDMA Forum's recommendation for NAM programming and activation of a cellular phone compliant with Telecommunications Industry Association (TIA) standards IS-136 & IS-137 based (digital) networks is described in chapter 8 of the *TDRA Forum's Implementation Guide, Version* 2, issued Mar. 9, 1995, which document is incorporated herein by reference. On page 5 of the Guide an *Easy Programming* sequence is suggested. This programming method would be required for all cellular phones or mobile stations, MSs, operating under the TIA's IS-136 standard. A standardized method of MS programming of this type is needed to enhance service, retail sales, and telemarketing distribution activities. The method involves the following assumptions:

1. for the majority of activations within a given system, the value entered for each NAM parameter is identical except for the unique MIN, i.e., mobile identification number or owner's phone number, and the A-key, i.e., encryption key, assigned to the owner or user;
2. A-Key entry is supported as defined in the TIA released *Technical Service Bulletin* 50;
3. fraud protection is not compromised since the ESN, i.e., the serial number of the phone inserted during manufacture, cannot be altered by the means described in this requirement;
4. the MS automatically retrieves the Alphanumeric SID, i.e., the alphanumeric form of the home system identification, from information contained in the system overhead message, as available (see *TDMA Forum* document *Non-Public Mode Operation and Selection in IS-136 Compliant Mobile Stations* for default Alpha Tags);
5. all other NAM parameters are defaulted from the MIN, SID, or factory defaults as defined in the *NAM Programming* section (8.3) of the *TDMA Forum's Guide* recommendation.

The steps of the method are (as shown in the flowchart in FIG. 3):

| Action | Comments |
| --- | --- |
| Enter # SID # SEND | SID = actual 6 digits of the customer's home SID (leading digits may be omitted by programmer). This step places the MS in programming mode and assigns the SID. Default is to program NAM1, when more than one NAM element is available, and with the MS's default language (e.g., English, French, Spanish). If a NAM and language other than the defaults are desired, they must be appropriately keyed in, e.g., # SID # NAM * Language |

-continued

| Action | Comments |
|---|---|
| | # SEND |
| The ESN Displays | The ESN is displayed in decimal (not hexadecimal). This step allows an activation person to associate the MS's ESN with the assigned MIN. |
| Press SEND | The programmer presses the SEND key to continue. |
| "Enter Phone Number" prompt displays | The MS prompts the programmer to enter the MIN. Although any appropriate prompt may be used, references to "MIN" should be avoided. |
| Enter MIN Press SEND | The programmer enters the 10 digit MIN and presses the SEND key to continue. The MS performs a simple check to ensure that 10 digits were entered. If the number of entered digits is other than 10, the MS should prompt the programmer to reenter the MIN with phrase "Try Again". |
| The MS retrieves and stores Alphanumeric SID (as available) from the system overhead. The MS defaults remaining NAM parameters based on SID and MIN as defined in Section 8.3 of the TDMA Forum's Guide. The MS reboots and acquires service. | |

While this sequence is of advantage, it still leaves room for improvement in fulfilling the desired functions discussed above and particularly in view of the current state of the art.

Objects

It is accordingly an object of the present invention to provide a solution relating to the current problems involved in operator assisted NAM programming.

It is another object of the invention to specify an easy activation sequence in connection with operator assisted NAM programming.

It is a further object of the invention to provide an easy activation sequence in connection with operator assisted NAM programming which is not dependent on the support provided by the network, but can be done locally in the phone in a manner that is ultimately safe enough to let the phone owner or user do the activation him/herself.

SUMMARY OF THE INVENTION

The present invention involves a variation on the recommended *Easy Programming* method in the *TDMA Forum's Implementation Guide, Version* 2, issued Mar. 9, 1995. The recommended method calls generally for a sequence of steps as described above and the invention improves upon this sequence by varying the steps to include a checking code calculation feature which enables a phone owner or user to safely carry out operator assisted NAM programming activation locally in the phone independent of the support provided by the network.

The essential information needed for achieving programming/activation in accordance with the invention is a "mobile identification number", MIN, a "home system identification", SID, and a checking code. The checking code is a checksum calculated from the MIN, the SID, and an ESN (serial number of the phone inserted during manufacture). Other possible factors in the calculation are a manufacturer code, MFR, and an A-key (encryption key) entry, if A-key entry is supported. The MIN, SID, checking code and A-key information can be obtained from the phone dealer during purchase or from the operator's service desk. With this information available the method of the invention can be executed locally in the phone by the phone purchaser or user without support provided by the network.

One embodiment of the invention including optional features involves a phone activated by the method generally comprising the steps of:

1. Starting the-programming/activation of a cellular phone by keying in, from the phone's keypad, a predetermined sequence of characters (activation code) to start the activation program locally in the phone;
2. Optionally selecting the NAM element, if other than NAM1 is to be programmed since the Default is normally 1;
3. Keying in the MIN (mobile identification number) and the SID (home system identification), in response to appropriate prompts and in between which the SEND key is pressed;
4. Optionally keying in the A-key (encryption key);
5. Optionally keying in the alphanumeric SID, which may be, for example, the operator's logo;
6. Keying in the checking code I (or 1), followed by pressing of the SEND key;
7. Calculating the checking code II (or 2) from the SID, MIN, (and A-key and/or alphanumeric SID) and the locally stored ESN;
8. Comparing the checking codes I and II, and if there is a match, the activation sequence is continued; otherwise, the method is interrupted and an indication is presented to repeat the process by returning to step 3.;
9. Storing the SID and MIN (and A-key and/or alphanumeric SID), and defaulting the remaining NAM parameters based on the SID and MIN as shown in FIG. 1; and
10. Powering off and rebooting the phone, whereupon the network service is acquired.

BRIEF DESCRIPTION OF THE DRAWINGS

FIG. 1 is a table illustrating a NAM structure in accordance with the present invention.

DETAILED DESCRIPTION OF THE PREFERRED EMBODIMENTS

Figure 2:
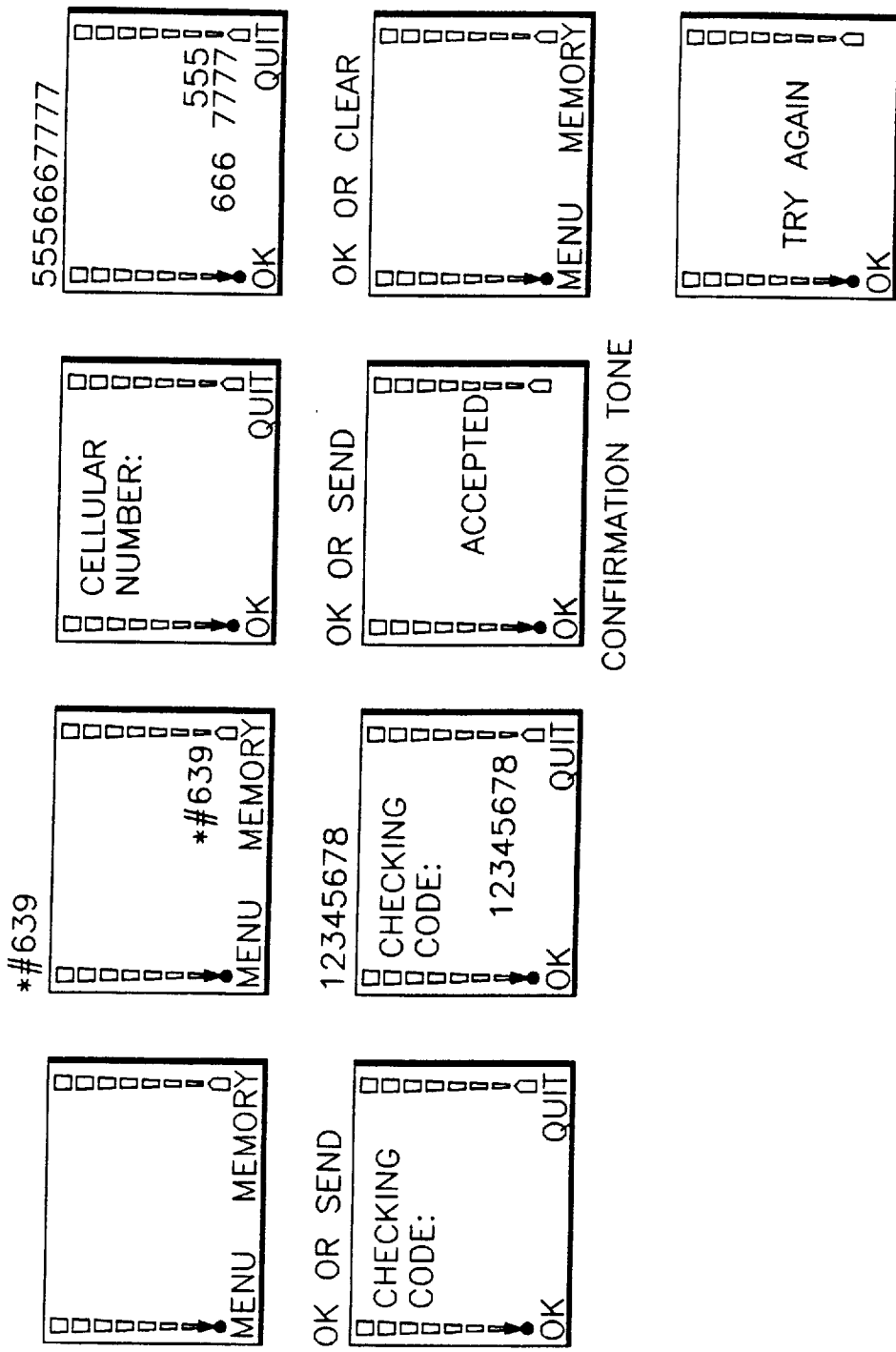
FIG. 2 shows a series of phone or MS displays illustrating the information or prompts appearing on the display screen during the sequence of operations carried out to achieve activation in accordance with the invention.

The operator assisted NAM programming procedure of the present invention allows the phone owner, user, or programmer to key in the essential NAM fields without fear of rendering the phone unworkable. Since any mistyped digits will lead to a situation where the phone will not work properly, certain factors must be considered to facilitate the successful completion of this NAM programming procedure. To avoid the acceptance of an erroneous NAM input, the phone is provided with a check procedure that can verify whether the new NAM programming is correct and in accordance with which a checksum is included in the information the user is to key in, with the number of keystrokes involved being minimized. Also, the phone is equipped to provide the programmer with appropriate prompts and feedback messages while the programming proceeds so that it is 'easy to use'. The method is adapted to be identical in all manufacturers' phones, and independent of the cellular system in which it is used with no manufacturing cost penalty resulting from including the procedure. The procedure makes it possible to use only the number keys, and *, #, Send, and End keys, to make sure that any keypad variant can use the same method. Finally, with the procedure, the phone has a full NAM programming feature that allows the fields in any of the NAM elements to be changed manually.

More particularly, the present invention involves cellular telephones and the specification of an Easy Activation sequence for cellular phones that may be implemented as will now be described in a preferred embodiment. This embodiment does not require A-key programming, but may readily be adapted to utilize it particularly when it comes into general use in existing networks.

Environment

The present invention may be applied in cellular phones or MSs, whether analog or digital, that use a Number Assignment Module or the like for storing activation information.

A Typical Procedure

A preferred purchase-programming procedure for a phone in accordance with the present invention generally involves the following steps:

1. When a user purchases a phone, there will be an accompanying leaflet, or sticker on top of the phone, that contains the activation instructions. These instructions include a phone number, such as a 1-800 number, that the user is to call when ready to activate the phone and whereupon it will be activated as an MS by a network operator.
2. The user firstly installs and charges the battery of the phone.
3. The user then calls the operator service number with a landline phone. The operator may ask the user for essential information such as his credit information and optionally checks it.
4. The user performs the Easy Activation sequence procedure and keys in a series of digit sets given by the operator and separated by pressing the Send key.
5. The operator then asks whether the phone is displaying a correct input indication, e.g., 'ACCEPTED' or an error indication, e.g., 'TRY AGAIN'. If the programming was done correctly, 'ACCEPTED' appears, and the user is asked to switch the phone off. Otherwise, 'TRY AGAIN' appears and the procedure is repeated until 'ACCEPTED' appears.
6. The user powers the phone off and then on again and it is ready for use in the network.

Contents of the NAM Structure

The NAM structure, which may be one of a number residing in the phone EEPROM memory, may consist of several parameters such as set forth in the table shown in FIG. 1. Only two of these parameters, i.e., the SID and the owner phone number, MIN, are required to be entered by the user. All other parameters can be derived from these two, as shown in the Figure. Among these parameters, the numbers 4, 5, and 9 are factory defaults and are not set during the Easy Activation process.

Activation Sequence of the Phone

The Easy Activation process of the invention preferably follows a prescribed sequence. It should be noted that this sequence will activate the activation mode until the next power off only.

When the phone is again switched on, it will behave normally. Also, the Easy Activation process, while always applying to the NAM1 element, is capable of additionally providing the activation several times for other NAM element fields. The display screen of the phone will appear as shown in the first frame in FIG. 2 before beginning the activation sequence. FIG. 3 illustrates a comparison of the sequence of this embodiment with the sequence recommended by the TDMA Forum.

Activation Code

The user will begin the process by first entering the activation mode, such as by manually keying in an activation code of the form:

*#639# (*#NEW#)

This is a standard activation code and it is stored in the EEPROM memory location of the phone at the factory. The display screen will indicate the code as shown in the second frame of FIG. 2. It is also possible to have an operator specific activation code stored in the EEPROM memory of the phone as will be described below, or activation may be accomplished in an automatic manner such as in the TDMA FORUM's recommended sequence. In any event, the activation mode must be entered to carry out the process.

Entering Activation Information

Figure 3A:
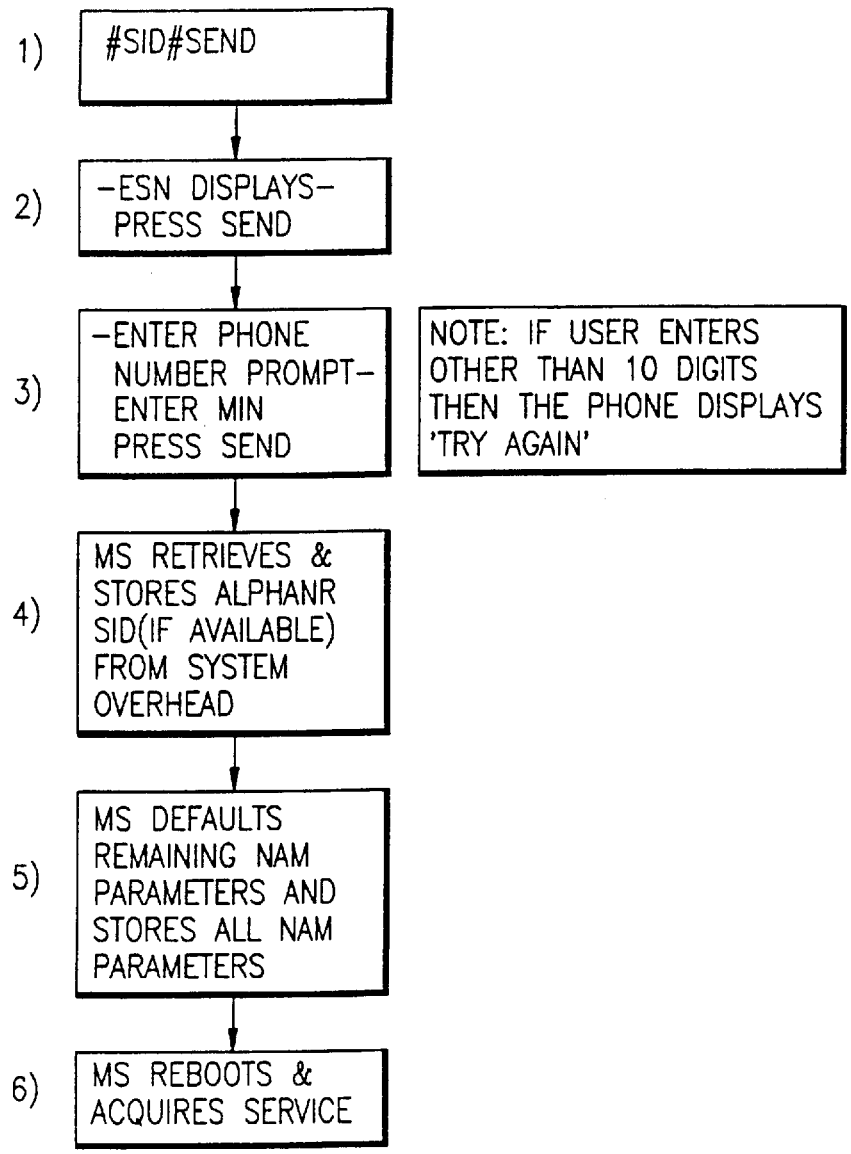
FIG. 3A is a flowchart illustrating a sequence of steps used in accordance with the prior suggested method of the TDMA Forum.
Figure 3B:
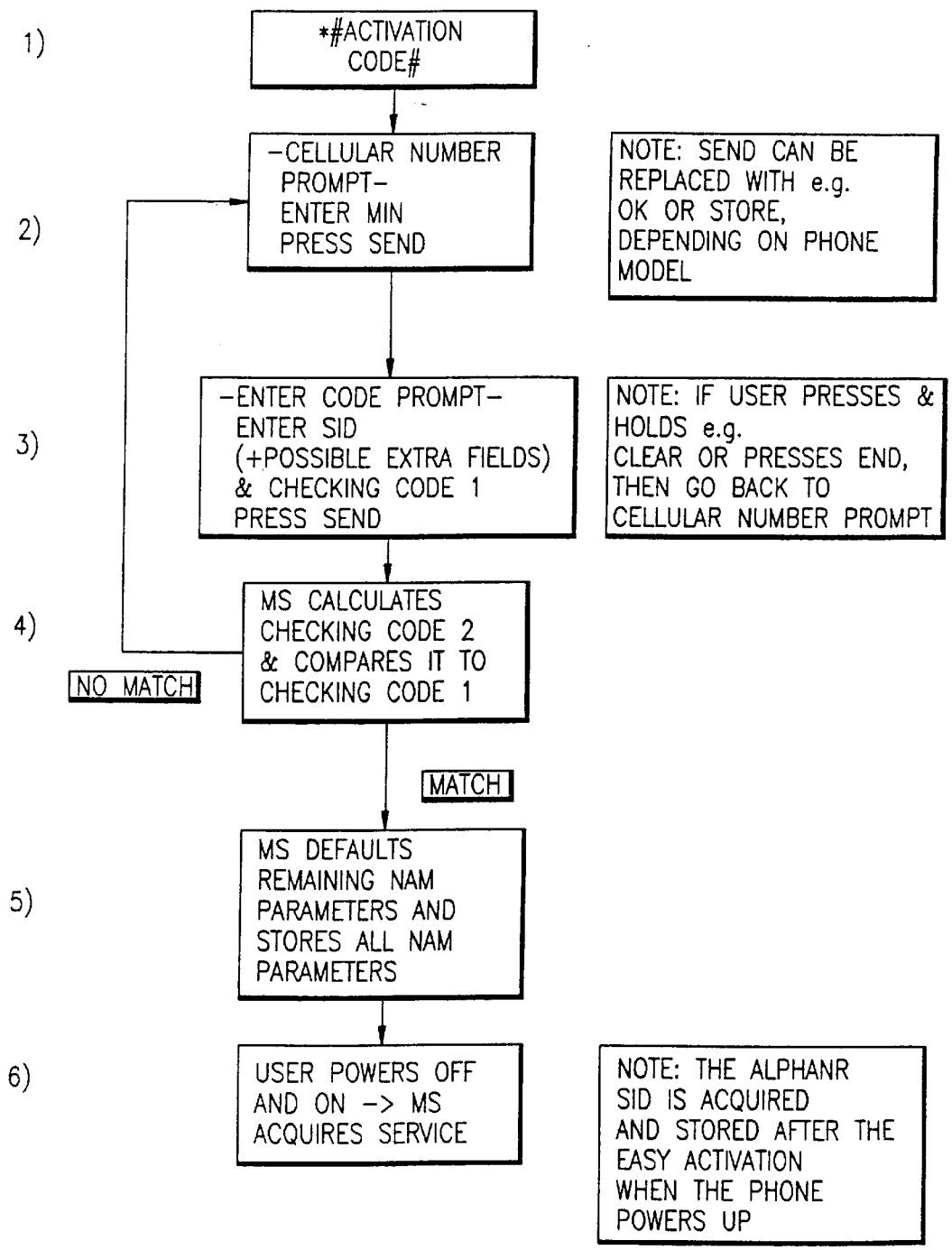
FIG. 3B is a flowchart illustrating a sequence of seeps used in accordance with the present invention.

Upon entering the activation code or other appropriate entry, the phone will go into activation mode and the phone display screen will indicate a suitable prompt, e.g., 'Cellular number:' such as shown in the third frame of FIG. 2. When the phone displays 'Cellular number:' on the screen, the user keys in the MIN or owner phone number, which is ten digits long, e.g., 555 666 7777, and it will appear on the screen (fourth frame of FIG. 2). After entering the number, the user next presses the OK or Send key. The phone will then display the prompt for the checking digits, e.g., 'Checking Code:', which appears on the screen as seen in the fifth frame of FIG. 2. The user may now key in a sequence of digits that include the SID (1 to 5 digits) and a checksum (4 digits), e.g., 12345678, which appear on the screen as shown in the sixth frame of FIG. 2, and then presses OK or Send again. Extra fields may also be entered, if desired, before the entry of the Send. The entered checksum, checking code 1, is then compared with a checking code 2, calculated from the SID, MIN, and the locally stored ESN. A match of code 1 with code 2 will indicate a correct result. If the procedure has been done correctly so that everything is OK, the phone gives a confirmation beep and shows the 'ACCEPTED' notification in the manner indicated in the seventh frame of FIG. 2. The 'ACCEPTED' indication stays on the screen until the user presses the OK or Clear key, whereupon the phone displays an empty idle mode screen again as shown in the eighth frame of FIG. 2. The phone will default the remaining NAM parameters and store all of the NAM parameters.

If any errors are detected and thus the programming did not succeed, the phone displays a 'TRY AGAIN' notification with an Error tone, as shown in the ninth frame of FIG. 2, rather than the 'ACCEPTED' indication as shown in the seventh frame. This 'TRY AGAIN' text or indication stays on the screen until the user presses the OK or Clear key. Then the phone, still in activation mode, returns to the first prompt, 'Cellular number:'. The user may then begin the activation sequence again by keying in the MIN and repeating the prompted steps until 'ACCEPTED' appears on the display.

It is also possible at any time during the sequence to return to the 'Cellular number:' prompt by holding down the Clear key or pressing the End key. This is achievable at any step prior to the 'ACCEPTED' indication, i.e., while in the activation mode. When the 'ACCEPTED' indication is being displayed, if the user presses the End or Clear key, the phone will go into idle mode and display an empty idle mode screen again as shown in the eighth frame of FIG. 2.

In all cases, after the 'ACCEPTED' indication is finally displayed and the phone returned to idle mode, with the NAM parameters stored, the user has to power the phone off and on again in order to complete the activation of the new NAM information.

Operator Specific Activation Code

As mentioned above, in some cases the activation code is defined separately by an operator, i.e., the operator has an activation code different from the 'standard' noted above. In this case keying in the normal code doesn't start the Easy Activation process and the appropriate code must be obtained from the operator. The operator specific activation code is always of the form, *#SOMETHING#, in which SOMETHING is any number string with a maximum length of five digits.

How the Checksum is Calculated

The SID and the owner number MIN are used to generate the 4-digit checksum as follows. Again, MFR means the manufacturer code and ESN means the serial number of the phone. Unused digits in these codes are treated as follows:

SID: 5 digits maximum, with unused digits being zeros at the end of the string (as will be seen in the example below).

MFR, ESN: These numbers are always of fixed length, i.e., 3 and 8, with unused digits being leading zeros, e.g., ESN 12345 will become 00012345.

MIN: This is always 10 digits, with unused digits set to 0. Accordingly,

```
Accordingly,
MIN = M1 M2 M3 M4 M5 M6 M7 M8 M9 M10
SID = S1 S2 S3 S4 S5
MFR = F1 F2 F3
ESN = E1 E2 E3 E4 E5 E6 E7 E8
The check sum:
                F1   F2   F3
                E1   E2   E3
                E4   E5   E6
                E7   E8   M1
                M2   M3   M4
                M5   M6   M7
                M8   M9   M10
                S1   S2   S3
                S4   S5   0 +

C1 C2  C3   C4
E.g., if  MIN = 1 2 3 4 5 6 7 8 9 0
          SID = 1 5
          MFR = 165
          ESN = 05902311
     Check sum =  1    6    5
                  0    5    9
                  0    2    3
                  1    1    1
                  2    3    4
                  5    6    7
                  8    9    0
                  1    5    0
```

```
                  0    0    0
                  2 1  9    9
```

It will be appreciated that the purpose of the checksum calculation, rather than eliminating fraud, is the elimination of typing errors and, since an ESN is included in the calculation, also the capability of checking that the phone gets correct SID and MIN entries that match the operator's bookkeeping of ESNS. This checking code calculation is an important difference between the invention and the known techniques referred in the "Prior Art" section above. Checking code calculation makes it ultimately safe enough to let the phone user do the activation him/herself.

Optional Steps

A number of additional steps may optionally be inserted in the foregoing essential sequence as desired or when appropriate.

For example, in phones with more than one NAM element, wherein the default is NAM1, a number of additional NAM elements may be individually programmed by simply selecting the number of the particular NAM desired. This selecting step would be performed following the entry of the activation mode and before initiating programming with the entry of the MIN.

Although the use of the A-key (encryption key) is presently not widely supported in existing networks, as noted above, the present method may readily be adapted to utilize it particularly when it comes into general use. Thus, an A-key entry may optionally be made after the entry of the MIN and the SID.

Also, optionally the alphanumeric SID, i.e., the alphanumeric form of the home system identification, e.g., the operator's logo, may be keyed in after the A-key entry, if it is not automatically available from the system overhead as provided for in the *TDMA Forum* document *Non-Public Mode Operation and Selection in IS-136 Compliant Mobile Stations* for default Alpha Tags. It may be acquired and stored after completion of the process when the phone is again powered up.

Wake-up Messages

Phones may have several "wake-up" messages programmed in the EEPROM memory, which are displayed when the phone is powered on. These can be divided into three classes: 1. Non-changeable wake-up messages, which are typically so-called product model wake-up messages that are programmed into phones at the factory; 2. Dealer (PC-locals or NAM programming) programmable wake-up messages, that are typically NAM's alpha field; and 3. User programmable wake-up messages. After the assisted NAM programming procedure has been completed, the phone must clear all dealer programmable wake-up messages, but not clear non-changeable or user programmable wake-up messages.

Extra Fields

In addition to the MIN and SID, the easy NAM programming sequence may include extra fields for the menu language and the lock-code of the product. Extra information like this will not be included in the checksum calculation and these fields may be keyed in as part of the second digit string when the 'Checking Code:' prompt is on the screen. Possible combinations are as follows:

| | |
|---|---|
| 123451234 SEND | standard easy activation |
| 123451234#1 SEND | standard NAM field + language setting |
| 123451234#7788 SEND | standard NAM field + lock code 7788 |
| 123451234#1#7788 SEND | standard NAM + language + lock code |
| 123451234#7788#1 SEND | standard NAM + lock code + language |

The length of the language setting is one digit. Recommended language settings are as follows:

1=French
2=Spanish
3=Portuguese
0=English (default).

It should be understood that the foregoing description of the Easy Activation sequence in accordance with the invention provides those of skill in the art basic structural and operational information and presents a preferred embodiment of the invention. This embodiment does not require A-key programming, but it may readily be adapted to do so particularly when such programming comes into general use in existing networks. The embodiment does require operators to have bookkeeping of ESNs. While this is not obligatory in many systems at the moment, with the widespread use of A-keying in the near future this should become a requirement.

It is possible to implement the user interface of the invention in various ways. One way is as described above using the 'Send' key. Another way is, as noted, by keying in the information in a single character string containing special delimiters, e.g., #12345#1234#1. The optional fields may be skipped with double-#, for example.

When the invention is used the requirement for a phone owner's or user's credit information check causes no trouble. The operator can do the check before giving the basic information like the SID and MIN or it can be done at the time of purchase of the phone.

The invention in principle supports any NAM structure, e.g., the one proposed in Figure 8.3-1. on page 7 of the TDMA Forum's proposal. However, to make the activation sequence as easy as possible, for example, the fields like PSID, RSID, XSID in that structure need not be involved in the present easy activation method, because they can be filled in, as noted above regarding the alphanumeric SID, from the network after the easy activation sequence is completed.

TDMA Cellular Systems Working Group 6 report entitled "On-Air-Activation, Version 6.2" and dated Apr. 25, 1995 contains material on OTA (over-the air-activation) for IS-136 systems wherein Chapter 4.1.4 refers to a programming method that is a mixture of manual activation and OTA. The invention can be applied as a manual part of OTA, but, of course, the manual part requires the OTA part for implementation. Other TIA Working Group reports, such as Stage 1, 2, and 3 Descriptions of Over-the-Air Activation, for IS-95 systems, issued respectively on Jul. 22, 1995, Dec. 12, 1994, and Sep. 12, 1994, contain material on OTA which is a fully (or semi) automatic way of programming NAM and activating a mobile phone. OTA requires strong support from the network, which currently is not generally available, so that it is not considered to be an immediate solution to the activation problem.

It will accordingly be seen that an Easy Activation procedure for cellular phones has been presented that has advantages beyond those of the procedures already suggested in the prior art, and particularly facilitates activation of a cellular phone by the owner or user with a minimum of input that is readily checked for errors.

What is claimed is:

1. A method for manually programming the Number Assignment Module (NAM) of a cellular phone, having a locally stored ESN, to activate said phone for operation in a cellular network, comprising the steps of:
    a) starting a programming/activation sequence by putting a cellular phone in an activation mode wherein the NAM is ready to accept parameter input;
    b) entering in MIN and SID parameters;
    c) entering in a checking code I;
    d) calculating a checking code II from said MIN, said SID, and said locally stored ESN of the phone;
    e) comparing said checking codes, I and II, and if there is a match continuing the programming/activation sequence with step g);
    f) otherwise, interrupting the programming/activation sequence, returning to step b), and repeating steps b) to e);
    g) storing said MIN and SID in said NAM and defaulting any remaining NAM parameters based on said MIN and SID parameters; and
    h) powering off and rebooting the cellular phone to acquire the network service.

2. The method of claim 1 wherein the step of starting the programming/activation sequence comprises keying in from the cellular phone's keypad a predetermined sequence of characters which start the activation mode locally in the cellular phone.

3. The method of claim 1 further comprising the step of:
    after starting step a), selecting the NAM element to be programmed with the default being 1.

4. The method of claim 1 further comprising the step of:
    after step b) of entering in the MIN and SID parameters, entering an A-key input.

5. The method of claim 1 further comprising the step of:
    after step b) of entering in the MIN and SID parameters, entering an alphanumeric SID input.

6. The method of claim 1 wherein said MIN comprises 10 digits, said SID comprises less than 6 digits, and said ESN comprises 8 digits.

7. The method of claim 1 further comprising the step of locally storing an MFR in said phone and wherein the step of calculating the checking code II comprises calculating said checking code from said MIN and SID parameters, and said locally stored ESN and MFR of the phone.

8. The method of claim 1 further comprising the steps of:
    after step b) of entering in the SID and MIN parameters, entering an A-key input; and
    entering in an alphanumeric SID input; and wherein the step of calculating the checking code II comprises calculating said checking code from said MIN and SID parameters, said A-key and alphanumeric SID inputs, and the locally stored ESN of the phone.

9. A cellular phone having a Number Assignment Module (NAM), with a locally stored ESN, that is capable of being manually activated and programmed for operation in a cellular network, comprising:
    a) means for starting a programming/activation sequence by putting the cellular phone in an activation mode wherein the NAM is ready to accept parameter input;
    b) means for keying in programming parameters;

c) means for accepting MIN, SID, and checking code I parameters entered by said keying means;

d) means for calculating a checking code II from said MIN, said SID, and said locally stored ESN of the phone;

e) means for comparing said checking codes, I and II for a match;

f) means, responsive to a non-match, for indicating that programming parameters should be keyed in;

g) means, responsive to a match, for storing said MIN and SID in said NAM and defaulting any remaining NAM parameters based on said MIN and SID; and h) means for powering off and rebooting the cellular phone to acquire the network service.

10. A cellular phone as in claim 9, further comprising display means for indicating a match and a non-match.

11. A cellular phone as in claim 9, further comprising means for storing a predetermined sequence of characters which start the activation mode locally in the cellular phone in response to the keying in of said sequence of characters from the cellular phone's keypad.

12. A cellular phone as in claim 9, further comprising means for selecting the NAM element to be programmed with the default being 1.

13. A cellular phone as in claim 9 further comprising means for accepting an A-key input.

14. A cellular phone as in claim 9 further comprising means for accepting an alphanumeric SID.

15. A cellular phone as in claim 9 wherein said keying means comprises key means, responsive to pressing and holding, for actuating said accepting means and prompting the acceptance of said MIN.

16. A method for manually programming the Number Assignment Module (NAM) of a cellular phone, having a locally stored ESN and a display screen, to activate said phone for operation in a cellular network, comprising the steps of:

A) starting the programming/activation sequence by keying in from a cellular phone's keypad a predetermined sequence of characters to start the activation program locally in the cellular phone wherein the NAM is put in an activation mode ready to accept parameter input;

B) displaying a prompt on the screen requesting the input of a MIN;

C) keying in a MIN and pressing the SEND key on the keypad;

D) displaying a prompt on the screen requesting the input of checking digits;

E) keying in a SID and checking digits and pressing the SEND key;

F) displaying an acceptance indication if the keyed in MIN, SID, and checking digits have been correctly entered, otherwise, displaying a repeat prompt on the screen;

G) pressing the CLEAR key on the keypad;

H) if the repeat prompt has been displayed, again displaying the prompt requesting the input of a MIN;

I) if the acceptance prompt has been displayed, storing the programmed information in the NAM ending the activation mode, and displaying an empty idle mode completing the programming of the NAM; and J) powering the cellular phone off and on again, whereupon the network service is acquired.

17. The method of claim 16 further comprising the step of:

pressing and holding the Clear or End key at any time during the sequence prior to the display of an acceptance indication, and again displaying the prompt requesting the input of a MIN.

18. The method of claim 16 wherein said step of keying in a SID and checking digits and pressing the SEND key comprises calculating a checking code from said MIN, said SID, and the locally stored ESN of the phone.

19. The method of claim 16 wherein said checking digits comprise four checking digits.

20. The method of claim 16 wherein said MIN comprises 10 digits, said SID comprises less than 6 digits, and said ESN comprises 8 digits.

* * * * *